(12) United States Patent
Yamagishi

(10) Patent No.: US 11,691,677 B2
(45) Date of Patent: Jul. 4, 2023

(54) VEHICLE BODY STRUCTURE

(71) Applicant: HONDA MOTOR CO., LTD., Tokyo (JP)

(72) Inventor: Hideaki Yamagishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 392 days.

(21) Appl. No.: 17/075,747

(22) Filed: Oct. 21, 2020

(65) Prior Publication Data

US 2021/0031839 A1 Feb. 4, 2021

Related U.S. Application Data

(62) Division of application No. 15/996,600, filed on Jun. 4, 2018, now Pat. No. 10,843,739.

(30) Foreign Application Priority Data

Jul. 7, 2017 (JP) ................................. 2017-133627

(51) Int. Cl.
*B62D 25/20* (2006.01)
*B62D 27/02* (2006.01)

(52) U.S. Cl.
CPC ............. *B62D 25/20* (2013.01); *B62D 27/02* (2013.01); *B62D 27/023* (2013.01)

(58) Field of Classification Search
CPC ....... B62D 27/023; B62D 25/20; B62D 27/02
USPC ........................ 219/86.1; 296/187.08, 193.07
See application file for complete search history.

(56) References Cited

U.S. PATENT DOCUMENTS

| | | | | | |
|---|---|---|---|---|---|
| 4,775,181 | A | * | 10/1988 | Shoda | B62D 25/06 296/213 |
| 5,829,666 | A | * | 11/1998 | Takeda | B21C 37/0803 228/175 |
| 6,126,232 | A | * | 10/2000 | Nakano | B62D 25/06 296/210 |
| 6,254,174 | B1 | * | 7/2001 | Wee | B62D 25/04 296/193.06 |

(Continued)

FOREIGN PATENT DOCUMENTS

| CN | 202827746 | 3/2013 |
|---|---|---|
| CN | 103112371 | 5/2013 |

(Continued)

OTHER PUBLICATIONS

Japanese Office Action for Japanese Patent Application No. 2017-133627 dated Mar. 26, 2019.

(Continued)

*Primary Examiner* — Jimmy Chou
(74) *Attorney, Agent, or Firm* — Amin, Turocy & Watson, LLP

(57) ABSTRACT

A vehicle body structure includes a floor tunnel, a cross member, and a bulkhead. The cross member includes a cross member longitudinal wall and a cross member flange. The bulkhead includes a bulkhead longitudinal wall. The bulkhead longitudinal wall and the cross member longitudinal wall are arranged at the same position in a vehicle body front-to-rear direction. The first cross member flange includes a bond part that is bonded to the floor tunnel and a welding part. The welding part is welded to the floor tunnel at a position that is more separated from the cross member longitudinal wall than the bond part.

10 Claims, 10 Drawing Sheets

(56) References Cited

U.S. PATENT DOCUMENTS

| | | | | |
|---|---|---|---|---|
| 6,578,909 B1* | 6/2003 | Reed | B62D 25/04 | 296/210 |
| 7,197,824 B1* | 4/2007 | Graber | B21D 7/028 | 29/897.35 |
| 7,552,964 B2* | 6/2009 | Saito | B62D 25/081 | 296/192 |
| 7,810,871 B2* | 10/2010 | Matsui | B62D 21/157 | 296/210 |
| 7,828,357 B2* | 11/2010 | Hayashi | B62D 25/06 | 296/29 |
| 7,900,997 B2* | 3/2011 | Hosaka | B62D 25/07 | 296/193.12 |
| 7,914,068 B2* | 3/2011 | Mizohata | B62D 25/02 | 296/193.06 |
| 8,052,205 B2* | 11/2011 | Matsuyama | B62D 25/2036 | 296/193.07 |
| 8,636,197 B1* | 1/2014 | Hill | B62D 25/06 | 156/60 |
| 8,766,133 B2* | 7/2014 | Gilles | B23K 15/0073 | 219/121.14 |
| 8,783,763 B1* | 7/2014 | Bach | B62D 25/06 | 296/210 |
| 9,394,018 B2* | 7/2016 | Kisaku | B62D 25/02 | |
| 9,604,675 B2* | 3/2017 | Kondo | B23K 31/02 | |
| 9,783,241 B2* | 10/2017 | Ishihara | B62D 27/023 | |
| 9,809,258 B2* | 11/2017 | Emura | B62D 25/08 | |
| 9,873,458 B2* | 1/2018 | Fukutomi | B62D 25/088 | |
| 9,884,653 B2* | 2/2018 | Shimizu | B62D 29/007 | |
| 9,925,737 B2* | 3/2018 | Nishiyama | B32B 15/016 | |
| 10,118,647 B2* | 11/2018 | Yoshida | B62D 21/155 | |
| 10,131,302 B2* | 11/2018 | Kashiwagi | B60R 11/00 | |
| 10,220,885 B2* | 3/2019 | Yamada | B23K 11/115 | |
| 10,335,890 B2* | 7/2019 | Kawai | B23K 11/065 | |
| 10,414,440 B2* | 9/2019 | Nakamoto | B62D 27/02 | |
| 10,926,811 B2* | 2/2021 | Lam | C22C 38/50 | |
| 2004/0197135 A1* | 10/2004 | Wang | B23K 26/211 | 219/121.64 |
| 2006/0055209 A1* | 3/2006 | Hoshino | B62D 25/04 | 296/203.03 |
| 2008/0178467 A1* | 7/2008 | Hayashi | B23K 11/115 | 29/33 B |
| 2008/0280195 A1* | 11/2008 | Kumar | H01M 50/244 | 429/100 |
| 2009/0278371 A1* | 11/2009 | Fuchs | B29C 65/562 | 156/60 |
| 2009/0302017 A1* | 12/2009 | Khakhalev | B23K 11/14 | 219/137 R |
| 2010/0066125 A1* | 3/2010 | Egawa | B62D 25/2036 | 296/193.07 |
| 2010/0127532 A1* | 5/2010 | Hosaka | B62D 25/06 | 296/193.06 |
| 2010/0140982 A1* | 6/2010 | Hosaka | B62D 25/06 | 296/210 |
| 2010/0156146 A1* | 6/2010 | Matsuyama | B62D 25/2036 | 296/193.07 |
| 2010/0196736 A1* | 8/2010 | Boger | B62D 25/20 | 428/339 |
| 2010/0259072 A1 | 10/2010 | Mizohata | | |
| 2010/0308623 A1* | 12/2010 | Bodin | B62D 29/00 | 296/193.06 |
| 2011/0156446 A1* | 6/2011 | Iwase | B62D 25/04 | 296/193.06 |
| 2011/0163571 A1* | 7/2011 | Furusako | B62D 25/06 | 296/193.06 |
| 2012/0061998 A1* | 3/2012 | Carsley | B62D 27/02 | 296/210 |
| 2012/0180910 A1* | 7/2012 | Thomas | C21D 8/04 | 148/531 |
| 2012/0256448 A1* | 10/2012 | Yasui | B62D 21/152 | 296/209 |
| 2012/0286542 A1* | 11/2012 | Kakiuchi | B62D 25/087 | 296/203.04 |
| 2012/0319431 A1* | 12/2012 | Bodin | B62D 25/04 | 296/203.03 |
| 2012/0319432 A1* | 12/2012 | Bodin | B62D 25/04 | 296/203.03 |
| 2013/0193716 A1* | 8/2013 | Kurokawa | B62D 25/06 | 296/193.06 |
| 2013/0257097 A1* | 10/2013 | Kojo | B62D 21/15 | 296/187.08 |
| 2013/0300155 A1* | 11/2013 | Kurokawa | B62D 25/06 | 296/193.06 |
| 2014/0016993 A1* | 1/2014 | Itoh | B23K 33/004 | 403/270 |
| 2014/0028057 A1* | 1/2014 | Nishimura | B62D 25/04 | 296/210 |
| 2014/0077529 A1* | 3/2014 | Kurokawa | B62D 25/16 | 296/193.06 |
| 2014/0127550 A1* | 5/2014 | Roh | H01M 50/178 | 429/153 |
| 2014/0138988 A1* | 5/2014 | Kisaku | B62D 33/0222 | 296/193.06 |
| 2014/0191536 A1* | 7/2014 | Elfwing | C21D 9/0068 | 296/193.06 |
| 2014/0217783 A1* | 8/2014 | Hida | B62D 25/06 | 296/210 |
| 2014/0224774 A1* | 8/2014 | Chergui | B23K 11/115 | 219/127 |
| 2014/0225399 A1* | 8/2014 | Ono | B62D 25/06 | 296/210 |
| 2014/0239672 A1* | 8/2014 | Yajima | B62D 25/04 | 296/193.06 |
| 2014/0265448 A1* | 9/2014 | Bartlett | B62D 25/04 | 156/60 |
| 2014/0306478 A1* | 10/2014 | Yao | B62D 27/023 | 296/29 |
| 2014/0312656 A1* | 10/2014 | Gim | B62D 25/06 | 296/210 |
| 2014/0319877 A1* | 10/2014 | Hida | B62D 25/02 | 296/193.06 |
| 2014/0354012 A1* | 12/2014 | Nagai | B60J 10/84 | 296/210 |
| 2015/0008703 A1* | 1/2015 | Furusaki | B62D 25/14 | 296/187.08 |
| 2015/0102623 A1* | 4/2015 | Watanabe | B23K 26/22 | 296/30 |
| 2015/0145290 A1* | 5/2015 | Shima | H02S 20/00 | 296/210 |
| 2015/0151617 A1* | 6/2015 | Um | B60J 7/043 | 296/216.07 |
| 2015/0232127 A1* | 8/2015 | Atsumi | B62D 25/2045 | 296/187.08 |
| 2015/0251705 A1* | 9/2015 | Mildner | B62D 25/2036 | 296/187.08 |
| 2015/0314363 A1* | 11/2015 | Nelson | B23K 11/115 | 219/78.16 |
| 2016/0023684 A1* | 1/2016 | Lange | B62D 25/02 | 296/203.01 |
| 2016/0023685 A1* | 1/2016 | Fujii | B62D 25/087 | 296/193.06 |
| 2016/0067813 A1* | 3/2016 | Sakamoto | B23K 37/0435 | 219/87 |
| 2016/0068196 A1* | 3/2016 | Saeki | B62D 21/157 | 296/187.08 |
| 2016/0083010 A1* | 3/2016 | Munzert | B62D 29/041 | 296/193.07 |
| 2016/0083018 A1* | 3/2016 | Anegawa | B62D 25/06 | 296/193.05 |
| 2016/0083021 A1* | 3/2016 | Kosaka | B62D 27/02 | 296/191 |
| 2016/0114834 A1* | 4/2016 | Kobayashi | B62D 27/023 | 296/210 |
| 2016/0136751 A1* | 5/2016 | Kawai | B23K 11/11 | 219/83 |
| 2016/0152277 A1* | 6/2016 | Rocheblave | B62D 29/005 | 296/193.06 |
| 2016/0186280 A1* | 6/2016 | Breidenbach | B62D 21/00 | 296/193.06 |

(56) References Cited

U.S. PATENT DOCUMENTS

| | | | |
|---|---|---|---|
| 2016/0244099 A1* | 8/2016 | Oshima | B62D 25/06 |
| 2016/0264181 A1* | 9/2016 | Jensen | B62D 29/00 |
| 2016/0288841 A1* | 10/2016 | Nakanishi | B62D 27/023 |
| 2016/0325786 A1* | 11/2016 | Elfwing | B62D 21/157 |
| 2017/0066037 A1* | 3/2017 | Kim | B21D 47/01 |
| 2017/0210211 A1* | 7/2017 | Clausen | B62D 29/008 |
| 2017/0233009 A1* | 8/2017 | Miranda | B62D 25/04 296/193.06 |
| 2017/0247774 A1* | 8/2017 | Sachdev | C22F 1/04 |
| 2017/0253276 A1* | 9/2017 | Shimizu | B62D 29/007 |
| 2017/0283892 A1* | 10/2017 | Garcia | C21D 1/09 |
| 2017/0291646 A1* | 10/2017 | Schneider | B62D 25/2036 |
| 2017/0305469 A1* | 10/2017 | Iyoshi | B62D 25/04 |
| 2017/0331086 A1* | 11/2017 | Frehn | H01M 50/224 |
| 2018/0111501 A1* | 4/2018 | Takeuchi | B60L 50/66 |
| 2018/0141591 A1* | 5/2018 | Urago | B62D 25/04 |
| 2018/0244314 A1* | 8/2018 | Cho | B62D 29/043 |
| 2018/0265138 A1* | 9/2018 | Nakayama | B62D 27/023 |
| 2018/0273095 A1* | 9/2018 | Chinzei | B62D 29/008 |
| 2019/0009833 A1* | 1/2019 | Yamagishi | B62D 27/023 |
| 2019/0061042 A1* | 2/2019 | Hahnlen | B23K 11/20 |
| 2019/0091748 A1* | 3/2019 | Nakazawa | C22C 38/04 |
| 2019/0144043 A1* | 5/2019 | Inamoto | B62D 27/02 296/193.06 |
| 2019/0168812 A1* | 6/2019 | Yamazaki | B62D 25/04 |
| 2019/0168823 A1* | 6/2019 | Nakamoto | B62D 25/06 |
| 2019/0168825 A1* | 6/2019 | Miyoshi | B62D 27/026 |
| 2021/0214012 A1* | 7/2021 | Takahashi | B62D 25/20 |

FOREIGN PATENT DOCUMENTS

| | | |
|---|---|---|
| CN | 104024093 | 9/2014 |
| CN | 204197064 | 3/2015 |
| EP | 3339017 | 6/2018 |
| JP | 2006-167764 | 6/2006 |
| JP | 5156729 | 3/2013 |
| JP | 2013-252799 | 12/2013 |
| JP | 2015-105033 | 6/2015 |
| JP | 2016-107807 | 6/2016 |
| JP | 2017-081200 | 5/2017 |

OTHER PUBLICATIONS

Chinese Office Action for Chinese Patent Application No. 201810554275.8 dated Jul. 2, 2020.
Non-Final Office Action for U.S. Appl. No. 15/996,600 dated Nov. 18, 2019.
Final Office Action for U.S. Appl. No. 15/996,600 dated May 21, 2020.
Notice of Allowance for U.S. Appl. No. 15/996,600 dated Aug. 3, 2020.
Chinese Office Action for Chinese Patent Application No. 201810554275.8 dated Feb. 7, 2021.

* cited by examiner

VEHICLE BODY STRUCTURE

CROSS-REFERENCE TO RELATED APPLICATIONS

This application is a Divisional of application Ser. No. 15/996,600 filed on Jun. 4, 2018, the entire contents of which are incorporated herein by reference.

Priority is claimed on Japanese Patent Application No. 2017-133627, filed on Jul. 7, 2017, the contents of which are incorporated herein by reference.

BACKGROUND

Field of the Invention

The present invention relates to a vehicle body structure.

Background

As a vehicle body structure, a structure is known in which a floor tunnel extends in a vehicle body front-to-rear direction, a cross member extends in a vehicle width direction from right and left sides of the floor tunnel, and a bulkhead is joined onto the extension line of the cross member at an inner part of the floor tunnel (for example, refer to Japanese Patent No. 5156729).

In this vehicle body structure, for example, in order to support an impact load that is input to the cross member from a lateral direction of the vehicle, it is necessary to ensure a load transmissibility from the cross member to the bulkhead. In order to ensure the load transmissibility from the cross member to the bulkhead, it is preferable that front and rear walls of the cross member be fitted to front and rear walls of the bulkhead in a vehicle body front-to-rear direction, and the cross member and the bulkhead be fitted to each other in the vehicle body front-to-rear direction.

In this state, a welding flange of the cross member and a welding flange of the bulkhead are joined to the floor tunnel by spot welding using welding equipment (for example, a welding gun). Thereby, when an impact load is input to the cross member from a vehicle width direction, the impact load is transmitted from the cross member to the bulkhead, and a load transmissibility is ensured. Accordingly, it is possible to support the impact load that is input to the cross member by the cross member.

SUMMARY

However, according to the vehicle body structure of Japanese Patent No. 5156729, when the welding flange of the cross member is welded by spot welding to the floor tunnel, it is conceivable that the welding equipment (welding gun) interferes with the bulkhead in the floor tunnel. Accordingly, it is necessary to join the main body of the cross member to the floor tunnel by spot welding at a position separated from the main body of the bulkhead.

Therefore, since the distance from the main body of the cross member to a joint point of the welding flange becomes long, the welding flange between the main body of the cross member to the joint point of the welding flange is deformed, and it becomes difficult to ensure a load transmissibility. From this point of view, there remains room for improvement.

An aspect of the present invention provides a vehicle body structure capable of ensuring a load transmissibility from a cross member to a floor tunnel side.

(1) A vehicle body structure according to an aspect of the present invention includes: a floor tunnel that is provided on a middle part in a vehicle width direction of a floor panel; a cross member that is joined to a side surface of the floor tunnel and that extends in a vehicle width direction; and a bulkhead that is provided at an inner part of the floor tunnel, wherein the cross member includes a cross member longitudinal wall that extends in a vehicle width direction and a vertical direction and a cross member flange that extends in a vehicle body front-to-rear direction from the cross member longitudinal wall, the bulkhead includes a bulkhead longitudinal wall that extends in a vehicle width direction and a vertical direction, the cross member longitudinal wall and the bulkhead longitudinal wall are arranged at the same position in a vehicle body front-to-rear direction, and the cross member flange includes a bond part that is bonded to the floor tunnel and a welding part that is welded to the floor tunnel at a position that is more separated from the cross member longitudinal wall than the bond part.

In this way, the bond part and the welding part are provided on the cross member flange. The bond part is a region that is bonded to the floor tunnel by a bond. Since the equipment mentioned above does not interfere with the bulkhead, it is possible to apply the bond to the vicinity of the cross member longitudinal wall. Therefore, the bond part is provided closer to the cross member longitudinal wall than the bond part.

On the other hand, the bond part is a region that is welded to the floor tunnel by spot welding, for example, using welding equipment (welding gun). Therefore, it is necessary to prevent interference with the bulkhead by the welding equipment. Accordingly, the welding part is provided at a position that is more separated than the cross member longitudinal wall with respect to the bond part.

By providing the bond part and the welding part on the cross member flange, it is possible to fix the bond part of the cross member flange by bonding to the vicinity of the cross member longitudinal wall. Accordingly, when an impact load is input to the cross member, it is possible to prevent deformation of a region in the vicinity of the cross member longitudinal wall of the cross member flange. That is, it is possible to prevent position displacement of the cross member longitudinal wall relative to the bulkhead longitudinal wall. Thereby, it is possible to ensure a load transmissibility that allows an impact load which is input to the cross member from a vehicle body side direction to transmit from the cross member longitudinal wall to the bulkhead longitudinal wall.

Further, the welding part is provided at a region that is separated from the bulkhead longitudinal wall of the cross member flange. Thereby, it is possible to ensure a joint strength of the cross member with respect to the floor tunnel.

(2) In the vehicle body structure described above, the cross member may include a lower member that is provided on the floor panel side and an upper member that is provided on an upper side of the lower member, the cross member flange may include a lower flange that is provided on the lower member and an upper flange that is provided on the upper member, and the bond part may be bonded continuously from the lower flange to the upper flange.

In this way, the bond part is formed continuously from the lower flange to the upper flange. Accordingly, it is possible to prevent position displacement between the lower flange and the upper flange by the bond. Thereby, it is possible to further favorably ensure a load transmissibility that allows an impact load which is input to the cross member from a vehicle body side direction to transmit from the cross member longitudinal wall to the bulkhead longitudinal wall.

(3) In the vehicle body structure described above, the cross member flange may include a flange welding part at which the lower flange and the upper flange are overlapped and are welded to each other, and the bond part may be provided so as to pass through the flange welding part.

In this way, the lower flange and a part of the upper flange are overlapped and welded to form the flange welding part. Accordingly, it is possible to ensure the rigidity of the flange welding part. The bond part passes through the flange welding part having an ensured rigidity.

Thereby, it is possible to allow an impact load to further favorably transmit from the cross member longitudinal wall to the bulkhead longitudinal wall by the flange welding part having an ensured rigidity.

(4) In the vehicle body structure described above, the bulkhead may be welded to both the lower flange and the upper flange.

In this way, both the lower flange and the upper flange are welded to the bulkhead. Accordingly, it is possible to further reliably prevent position displacement of the cross member longitudinal wall relative to the bulkhead longitudinal wall.

Thereby, it is possible to allow an impact load that is input to the cross member from a vehicle body side direction to further favorably transmit from the cross member longitudinal wall to the bulkhead longitudinal wall.

(5) In the vehicle body structure described above, the floor tunnel may include a ridgeline patch that extends in a vehicle body front-to-rear direction along a ridgeline, and the cross member flange may be welded to the ridgeline patch.

In this way, the ridgeline patch extends in the vehicle body front-to-rear direction along the ridgeline of the floor tunnel. The cross member flange is welded to the ridgeline patch. Accordingly, it is possible to allow an impact load that is input to the cross member from a vehicle body side direction to transmit in the vehicle body front-to-rear direction of the floor tunnel via the ridgeline patch. Thereby, it is possible to support the impact load that is input to the cross member by the entire vehicle.

(6) A vehicle body structure according to another aspect of the present invention includes: a bonded panel; and first and second panels that are bonded to the bonded panel by a bond part, wherein the bonded panel includes: a first sole part at which the first panel solely overlaps the bonded panel; a three-component overlapping part at which the first panel and the second panel overlap the bonded panel; and a second sole part at which the second panel solely overlaps the bonded panel, the bond part is provided continuously from a start point that is provided on the first sole part via the three-component overlapping part to an end point that is provided on the second sole part, and the start point and the end point are welded to the bonded panel.

In this way, the first sole part at which the first panel solely overlaps the bonded panel is provided. Further, the three-component overlapping part at which the bonded panel, the first panel, and the second panel overlap one another is provided. Further, the second sole part at which the second panel solely overlaps the bonded panel is provided.

In the vicinity of the three-component overlapping part, it is conceivable that a gap having a size of the first panel opens between the second panel and the bonded panel. Even in this case, by filling the gap having a size of the first panel using a bond, it is possible to bond the second panel to the bonded panel. Thereby, it is possible to continuously bond the three panels, namely the bonded panel, the first panel, and the second panel.

Further, the start point is provided on the first sole part, and the end point is provided on the second sole part. The bond part is provided continuously from the start point via the three-component overlapping part to the end point. That is, the first panel and the second panel are bonded to the bonded panel continuously from the start point via the three-component overlapping part to the end point. Accordingly, it is possible to solidly bond the first panel and the second panel to the bonded panel. Thereby, it is possible to allow an impact load that is input to the first panel and the second panel to favorably transmit to the bonded panel side, and it is possible to ensure a load transmissibility from the first panel and the second panel to the bonded panel side.

Further, the start point and the end point are welded to the bonded panel. Accordingly, the start point and the end point that are bonded to the bonded panel are solidly fixed by welding. Thereby, it is possible to prevent the start point and the end point of the bond part from peeling from the bonded panel.

(7) In the vehicle body structure described above, in the three-component overlapping part, the first panel and the second panel may be overlapped in this order on the bonded panel, the second panel may include a first surface and a second surface that extends in a direction which crosses with respect to the first surface, the three-component overlapping part may be provided on the first surface, and the end point may be provided on the second surface.

In this way, the second panel includes the first surface and the second surface. The second surface extends in a direction that crosses with respect to the first surface. The three-component overlapping part is provided on the first surface, and the end point is provided on the second surface. Accordingly, in a state of a gap having a size of the first panel between the first surface and the bonded panel being acceptable, it is possible to allow the second surface and the bonded panel to be in contact with each other and to be welded to each other. Thereby, it is possible to enhance the assembly property of the bonded panel, the first panel, and the second panel.

According to an aspect of the present invention, the bond part and the welding part are provided on the cross member flange, and the bond part is provided in the vicinity of the cross member longitudinal wall. Further, the welding part is provided at a position that is more separated than the cross member longitudinal wall with respect to the bond part. Thereby, it is possible to ensure a load transmissibility from the cross member to the floor tunnel side.

DESCRIPTION OF THE EMBODIMENTS

Figure 1:
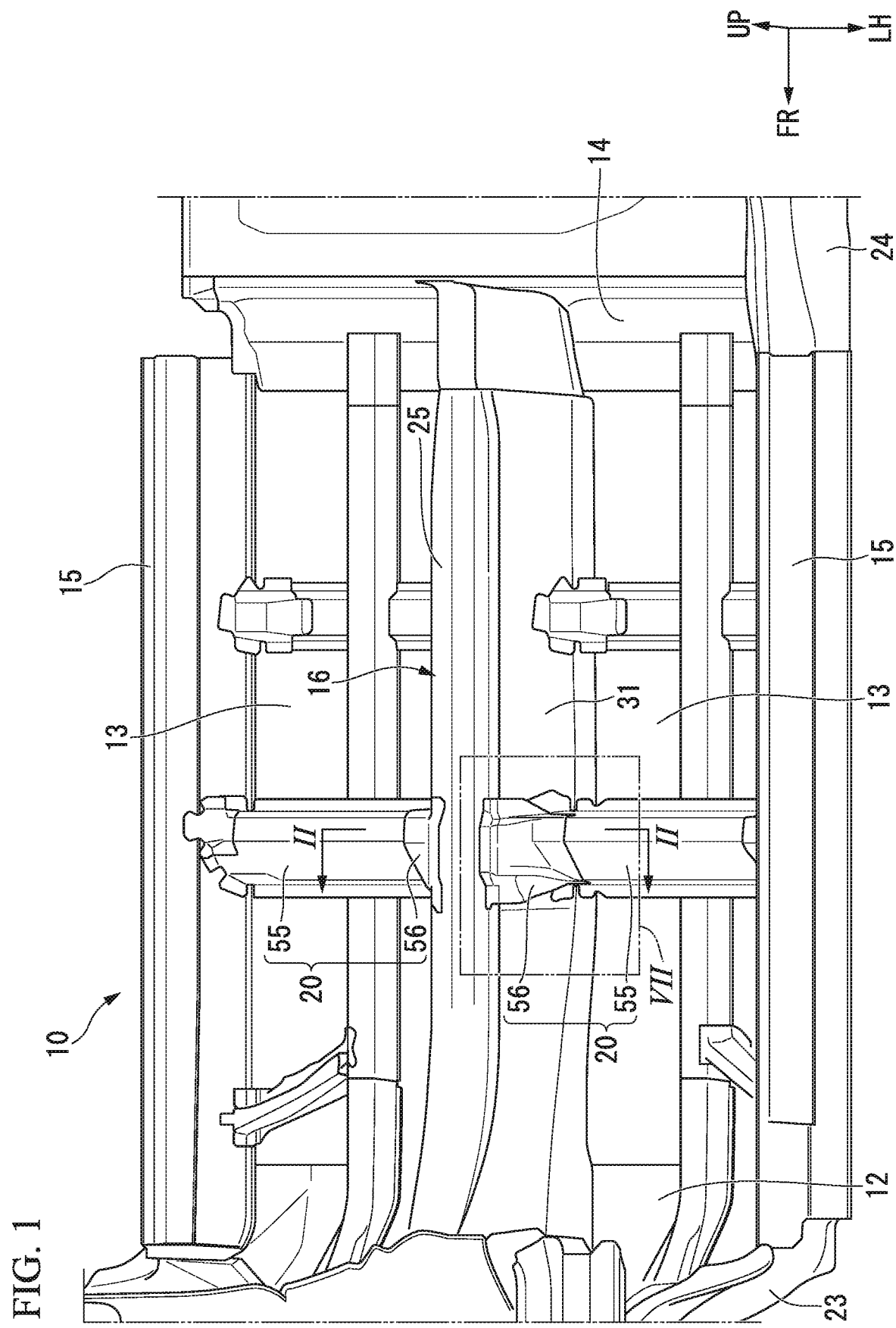
FIG. 1 is a perspective view showing a vehicle body structure in an embodiment of the present invention.

An embodiment of the present invention will be described with reference to the drawings. In the drawings, an arrow FR indicates a frontward direction of a vehicle, an arrow UP indicates an upward direction of the vehicle, and an arrow LH indicates a leftward direction of the vehicle.

A vehicle body structure 10 has a substantially symmetric configuration in the right-to-left direction. Accordingly, the same reference signs are given to the right configuration members and the left configuration members, the left configuration is described, and description of the right configuration is omitted.

As shown in FIG. 1, the vehicle body structure 10 includes a dashboard lower member 12, right and left floor panels 13, a kick-up panel 14, right and left side sills 15, a floor tunnel 16 (bonded panel), a bulkhead 18 (refer to FIG. 2), and right and left cross members 20.

The left side sill 15 is arranged on a left side in a vehicle width direction and extends toward a vehicle body rearward direction from an outer end part of an outrigger 23 to a kick-up part 24. The right side sill 15 is formed substantially symmetrically in the right-to-left direction to the left side sill 15.

The floor tunnel 16 is provided on a middle part in the vehicle width direction of the right and left side sills 15. The floor tunnel 16 extends toward the vehicle body rearward direction from the dashboard lower member 12 to the kick-up panel 14.

Figure 2:
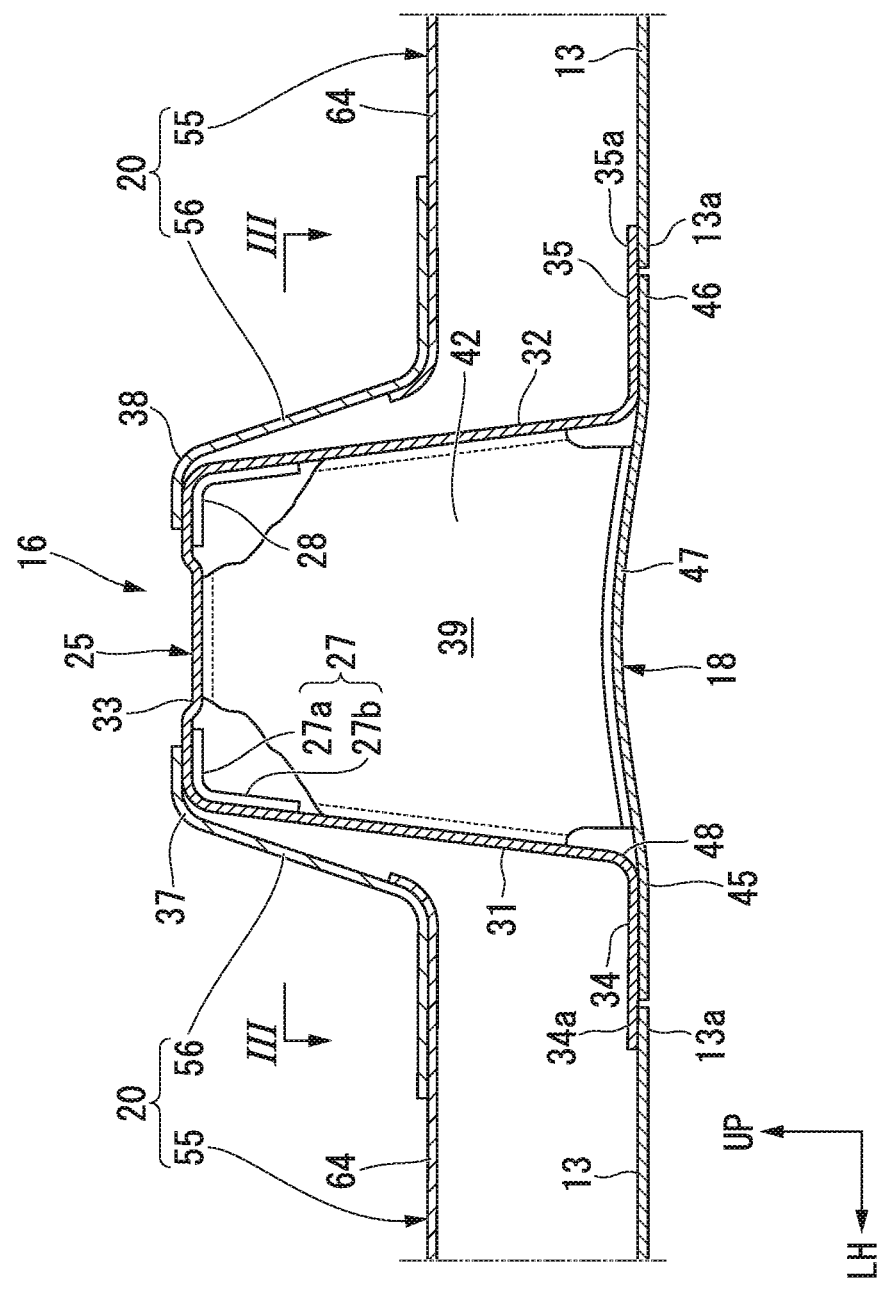
FIG. 2 is a cross-sectional view showing a state broken at a II-II line of FIG. 1 in the embodiment of the present invention.
Figure 3:
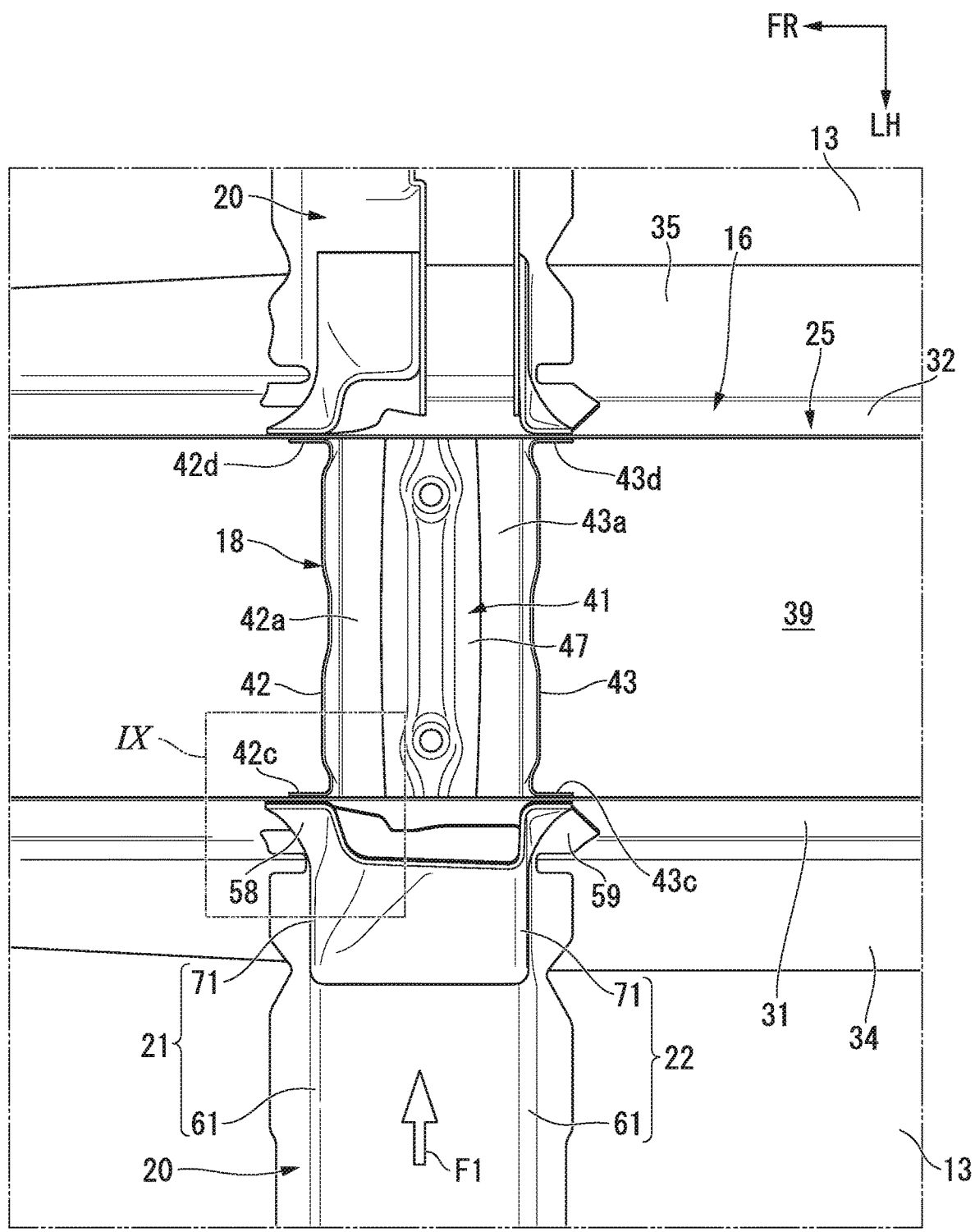
FIG. 3 is a cross-sectional view showing a state broken at a line of FIG. 2 in the embodiment of the present invention.

As shown in FIG. 2 and FIG. 3, the floor tunnel 16 includes a tunnel main body 25, a left ridgeline patch (ridgeline patch) 27, and a right ridgeline patch (ridgeline patch) 28. The tunnel main body 25 has a tunnel left side wall 31 (a side surface of the floor tunnel), a tunnel right side wall 32 (a side surface of the floor tunnel), a tunnel top part 33, a tunnel left flange 34, and a tunnel right flange 35.

The tunnel left side wall 31 and the tunnel right side wall 32 are arranged in a state of standing to be spaced in the vehicle width direction. The tunnel left side wall 31 extends to be an upslope toward the right side in the vehicle width direction. The tunnel left side wall 31 extends to be an upslope toward the right side in the vehicle width direction and forms a left side surface of the floor tunnel 16.

The tunnel right side wall 32 extends to be an upslope toward the left side in the vehicle width direction. The tunnel right side wall 32 extends to be an upslope toward the left side in the vehicle width direction and forms a right side surface of the floor tunnel 16.

An upper end part of the tunnel left side wall 31 and an upper end part of the tunnel right side wall 32 are connected by the tunnel top part 33. A left ridgeline (ridgeline) 37 is formed on an intersection of the upper end part of the tunnel left side wall 31 and the tunnel top part 33. The left ridgeline patch 27 is joined to the left ridgeline 37 from the inside of the floor tunnel 16. The left ridgeline patch 27 has a patch horizontal part 27a that is joined to the tunnel top part 33 and a patch vertical part 27b that is joined to the tunnel left side wall 31.

The left ridgeline patch 27 is formed of the patch horizontal part 27a and the patch vertical part 27b in a V shape in cross-section. The left ridgeline patch 27 extends in the vehicle body front-to-rear direction along the left ridgeline 37 (refer to FIG. 4).

A right ridgeline (ridgeline) 38 is formed on an intersection of the upper end part of the tunnel right side wall 32 and the tunnel top part 33. The right ridgeline patch 28 is joined to the right ridgeline 38 from the inside of the floor tunnel 16. The right ridgeline patch 28 extends in the vehicle body front-to-rear direction along the right ridgeline 38. The right ridgeline patch 28 is formed similarly to the left ridgeline patch 27.

The left ridgeline patch 27 is joined to the left ridgeline 37, the right ridgeline patch 28 is joined to the right ridgeline 38, and thereby, the rigidity of the floor tunnel 16 is ensured by the left ridgeline patch 27 and the right ridgeline patch 28 against an impact load that is input to the floor tunnel 16 from a vehicle body front-to-rear direction.

The tunnel left flange 34 protrudes leftward in the vehicle width direction from a lower end part of the tunnel left side wall 31. The tunnel right flange 35 protrudes rightward in the vehicle width direction from a lower end part of the tunnel right side wall 32.

An inner side 13a of the left floor panel 13 is joined to a left side of the tunnel left flange 34 from a lower direction. An outer side of the left floor panel 13 is joined to the left side sill 15 (refer to FIG. 1). An inner side 13a of the right floor panel 13 is joined to a right side 35a of the tunnel right flange 35 from a lower direction. An outer side of the right floor panel 13 is joined to the right side sill 15 (refer to FIG. 1). The bulkhead 18 is provided at an inner part 39 of the tunnel main body 25.

Figure 4:
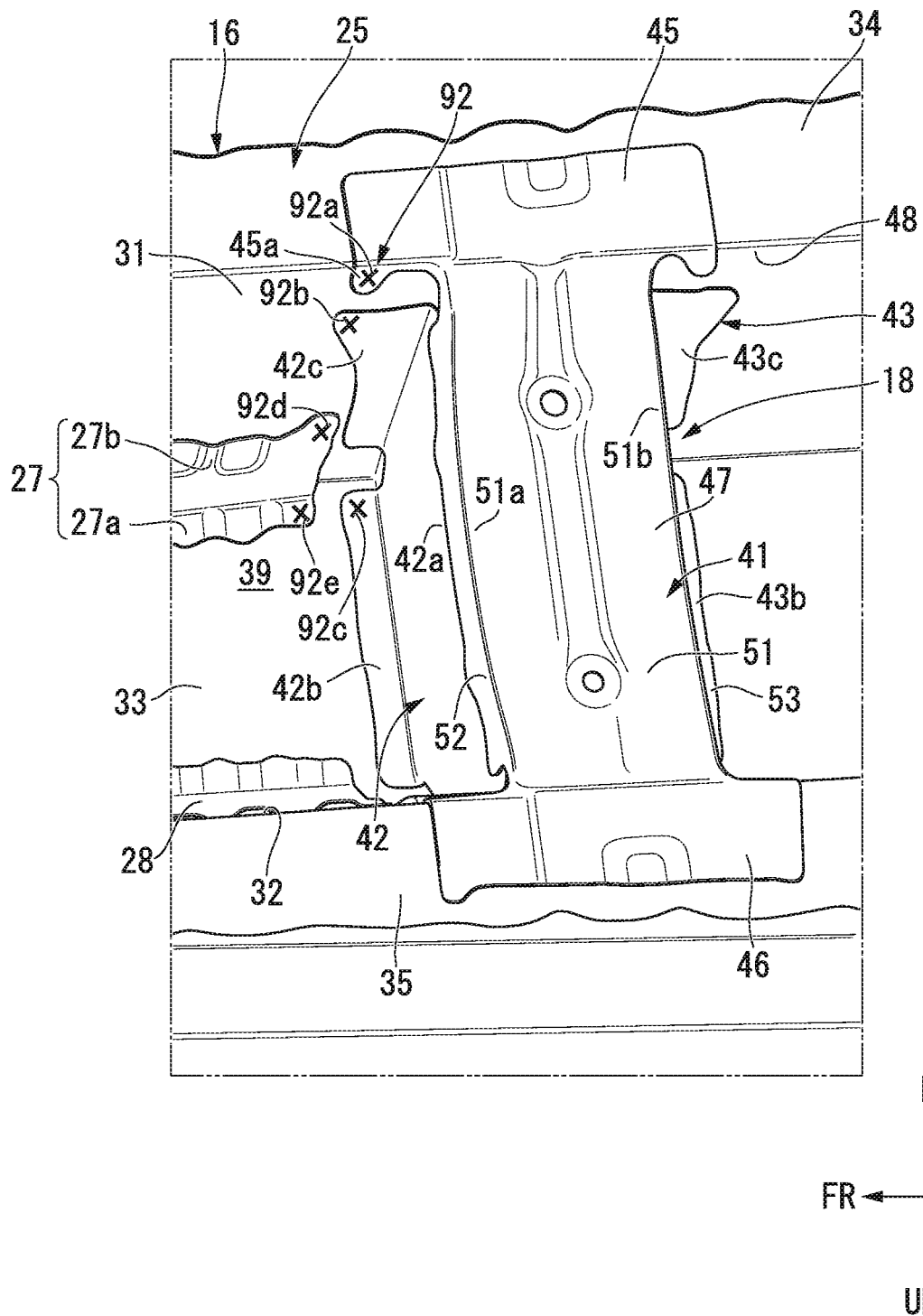
FIG. 4 is a perspective view showing a state seen from a downward direction of a floor tunnel of a vehicle body structure in the embodiment of the present invention.

As shown in FIG. 3 and FIG. 4, the bulkhead 18 includes a bulkhead connection part 41, a first bulkhead longitudinal wall 42, and a second bulkhead longitudinal wall 43.

The bulkhead connection part 41 has a left flange section 45, a right flange section 46, and a connection section 47. The left flange section 45 is formed on a left side of the connection section 47. The right flange section 46 is formed on a right side of the connection section 47. The left flange section 45 is joined to the tunnel left flange 34 from a lower direction. The right flange section 46 is joined to the tunnel right flange 35 from a lower direction. In this state, the connection section 47 is arranged on an opening part 48 of the tunnel main body 25 so as to extend in a vehicle width direction.

The connection section 47 has a connection panel 51, a first connection section flange 52, and a second connection section flange 53. The connection panel 51 is arranged at a position that is opposed to the tunnel top part 33 and is formed in a plate shape. The first connection section flange 52 stands toward the tunnel top part 33 from a front side of the connection panel 51. The second connection section flange 53 stands toward the tunnel top part 33 from a rear side of the connection panel 51.

A lower end part 42a of the first bulkhead longitudinal wall 42 is joined to the first connection section flange 52 and the front side 51a of the connection panel 51. The first bulkhead longitudinal wall 42 extends in a vehicle width direction and a vertical direction. The first bulkhead longitudinal wall 42 has a first upper longitudinal wall flange 42b, a first left longitudinal wall flange 42c, and a first right longitudinal wall flange 42d.

The first upper longitudinal wall flange 42b is joined to and along the tunnel top part 33. The first left longitudinal wall flange 42c is joined to and along the tunnel left side wall 31. The first right longitudinal wall flange 42d is joined to and along the tunnel right side wall 32.

A lower end part 43a of the second bulkhead longitudinal wall 43 is joined to the second connection section flange 53 and the rear side 51b of the connection panel 51. The second bulkhead longitudinal wall 43 is formed substantially symmetrically in the vehicle body front-to-rear direction to the first bulkhead longitudinal wall 42.

The second bulkhead longitudinal wall 43 extends in a vehicle width direction and a vertical direction. The second bulkhead longitudinal wall 43 has a second upper longitudinal wall flange 43b, a second left longitudinal wall flange 43c, and a second right longitudinal wall flange 43d. The second upper longitudinal wall flange 43b is joined to and along the tunnel top part 33. The second left longitudinal wall flange 43c is joined to and along the tunnel left side wall 31. The second right longitudinal wall flange 43d is joined to and along the tunnel right side wall 32.

The bulkhead 18 is provided at the inner part 39 of the tunnel main body 25, and thereby, the rigidity of the floor tunnel 16 is ensured by the bulkhead 18 against an impact load that is input to the floor tunnel 16 from a vehicle width direction.

Further, the bulkhead 18 is provided at the inner part 39 of the tunnel main body 25, and thereby, it is possible to prevent the opening part 48 of the tunnel main body 25 from opening in a vehicle width direction.

With reference to FIG. 1, the left cross member 20 is joined to the tunnel left side wall 31 of the tunnel main body 25. That is, the left cross member 20 is joined to the tunnel left side wall 31 of the floor tunnel 16 (tunnel main body 25) and extends to the left side sill 15 in the vehicle width direction. The left cross member 20 includes a lower member 55 and an upper member 56.

The right cross member 20 is formed substantially symmetrically in the right-to-left direction to the left cross member 20. Hereinafter, detailed description of the right cross member 20 is omitted, and the left cross member 20 is described as a "cross member 20".

Figure 5:
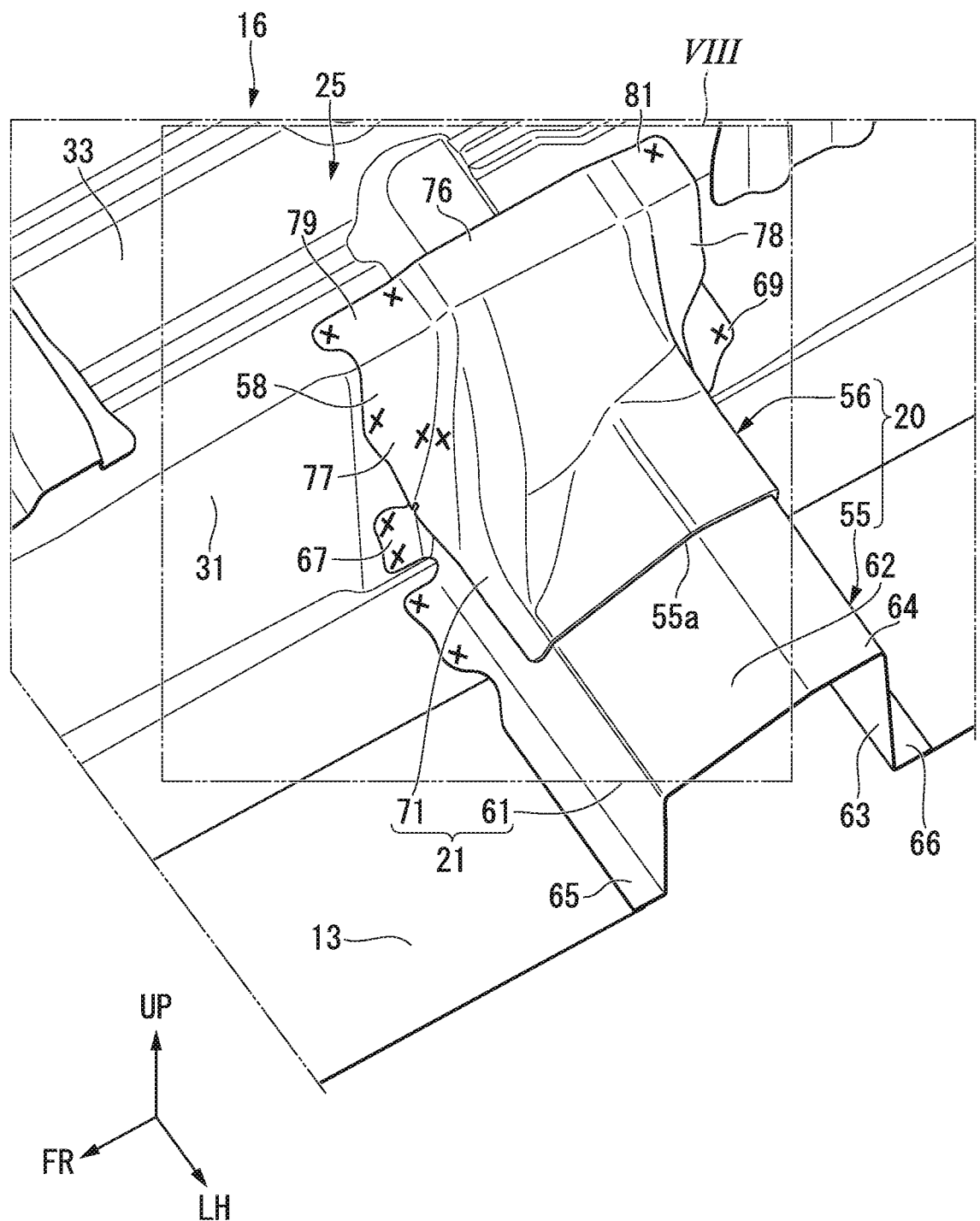
FIG. 5 is a perspective view showing a cross member of the vehicle body structure in the embodiment of the present invention.
Figure 6:
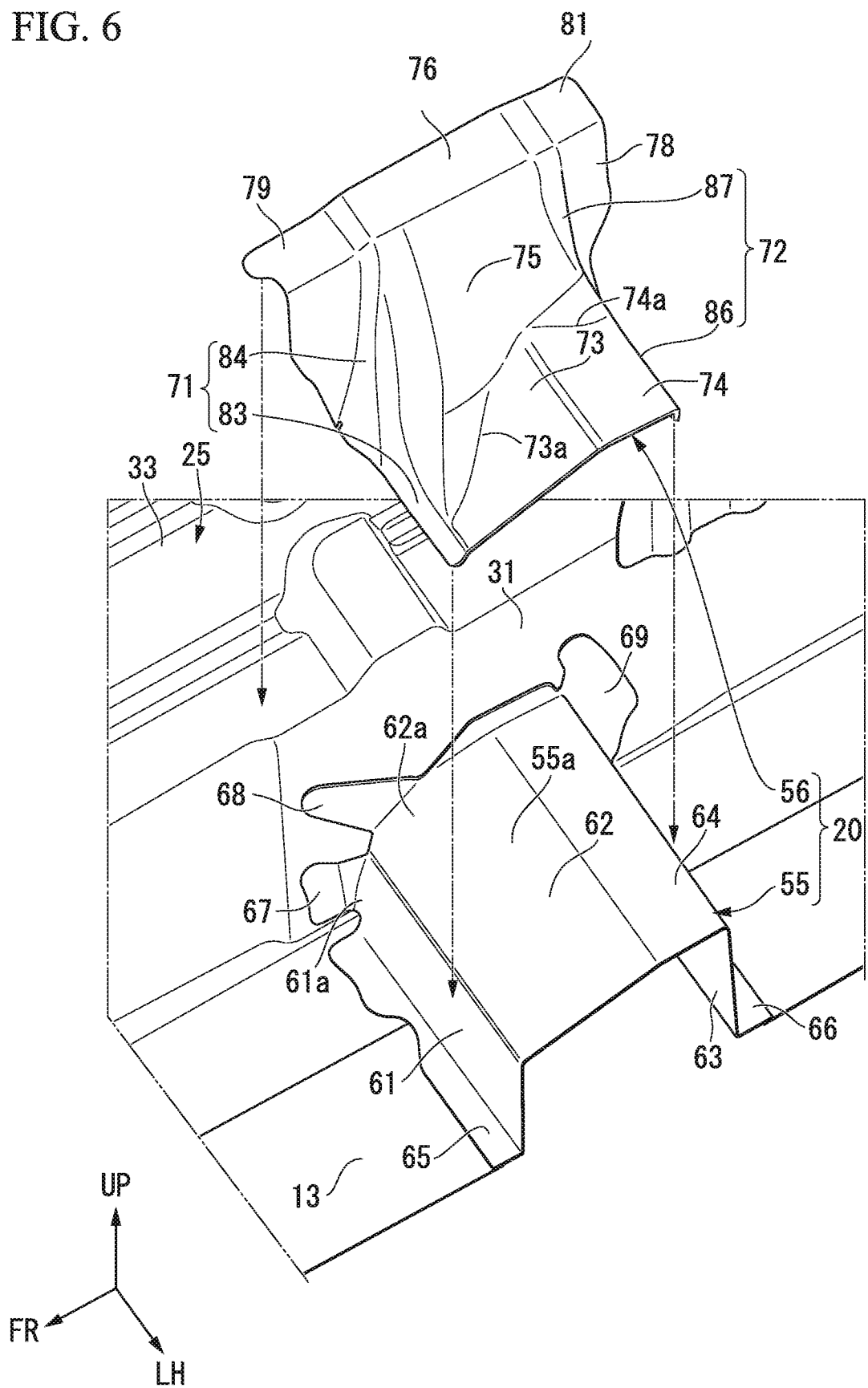
FIG. 6 is an exploded perspective view showing the cross member of FIG. 5 in the embodiment of the present invention.

As shown in FIG. 5 and FIG. 6, the lower member 55 is provided on the left floor panel 13 side. The lower member 55 is interposed between the floor tunnel 16 and the left side sill 15 (refer to FIG. 1) and extends in the vehicle width direction. The lower member 55 has a first lower longitudinal wall 61, a lower slope wall 62, a second lower longitudinal wall 63, a lower top part 64, a first lower flange 65, a second lower flange 66, a third lower flange (lower flange, first panel) 67, a fourth lower flange (lower flange, first panel) 68, and a fifth lower flange (lower flange, first panel) 69.

The first lower longitudinal wall 61 and the second lower longitudinal wall 63 are arranged to be spaced in the vehicle body front-to-rear direction. The first lower longitudinal wall 61 extends in the vehicle width direction and the vertical direction. The lower slope wall 62 extends to be an upslope toward the vehicle body rearward direction from an upper side of the first lower longitudinal wall 61. The lower top part 64 extends toward the vehicle body rearward direction from a rear side of the lower slope wall 62 and is connected to an upper side of the second lower longitudinal wall 63.

The second lower longitudinal wall 63 extends in the vehicle width direction and the vertical direction.

The first lower flange 65 protrudes in the vehicle body frontward direction along the left floor panel 13 from a lower side of the first lower longitudinal wall 61. The first lower flange 65 is welded to the left floor panel 13, for example, by spot welding. The second lower flange 66 protrudes in the vehicle body frontward direction along the left floor panel 13 from a lower side of the second lower longitudinal wall 63. The second lower flange 66 is welded to the left floor panel 13, for example, by spot welding.

The third lower flange 67 protrudes in the vehicle body frontward direction along the tunnel left side wall 31 from an inner end 61a of the first lower longitudinal wall 61. The fourth lower flange 68 protrudes in a sloped manner in the vehicle body frontward direction and the upward direction along the tunnel left side wall 31 from an inner end 62a of the lower slope wall 62.

The fifth lower flange 69 protrudes in the vehicle body rearward direction along the tunnel left side wall 31 from an inner end of the second lower longitudinal wall 63.

The third lower flange 67, the fourth lower flange 68, and the fifth lower flange 69 are joined to the tunnel left side wall 31 by spot welding, a bond, and the like as described later.

Figure 7:
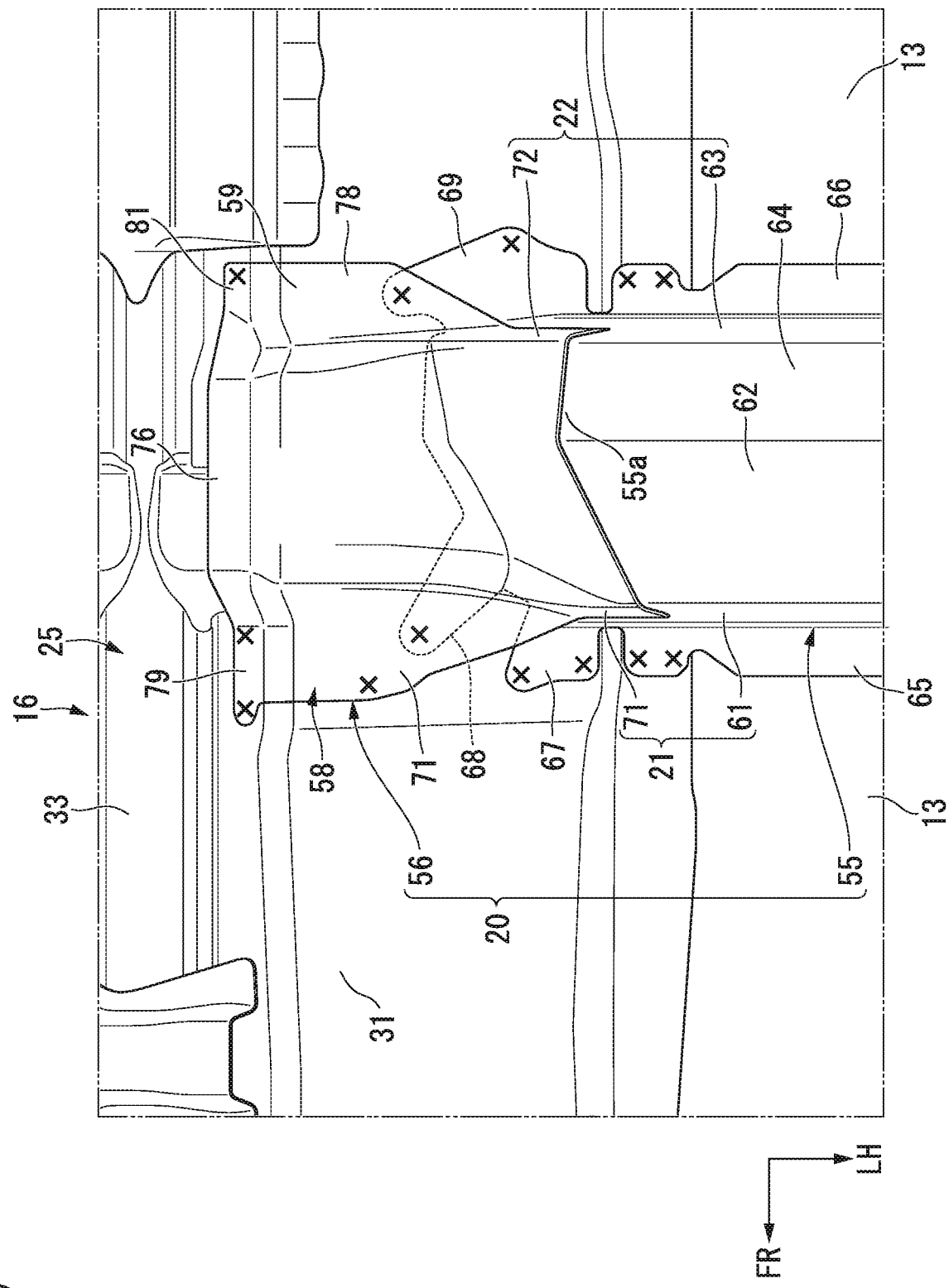
FIG. 7 is a perspective view showing an enlarged state of a VII part of FIG. 1 in the embodiment of the present invention.

As shown in FIG. 6 and FIG. 7, the upper member 56 is provided on an upper side of an inner end part 55a of the lower member 55. The upper member 56 has a first upper longitudinal wall 71, a second upper longitudinal wall 72, an upper slope wall 73, an upper top part 74, an upper side wall 75, an upper folded part 76, a first upper flange (upper flange, second panel) 77, a second upper flange (upper flange, second panel) 78, a third upper flange (upper flange, second panel) 79, and a fourth upper flange (upper flange, second panel) 81.

The first upper longitudinal wall 71 has a first laterally directed longitudinal wall 83 and a first longitudinally directed longitudinal wall 84. The second upper longitudinal wall 72 has a second laterally directed longitudinal wall 86 and a second longitudinally directed longitudinal wall 87.

The first laterally directed longitudinal wall 83, the upper slope wall 73, the upper top part 74, and the second laterally directed longitudinal wall 86 are joined to the inner end part 55a of the lower member 55 in an overlapped state from the upward direction. Specifically, the first laterally directed longitudinal wall 83 is joined to an inner end part of the first lower longitudinal wall 61. The upper slope wall 73 is joined to an inner end part of the lower slope wall 62. The upper top part 74 is joined to an inner end part of the lower top part 64. The second laterally directed longitudinal wall 86 is joined to an inner end part of the second lower longitudinal wall 63.

In this state, the upper member 56 is joined to the inner end part 55a of the lower member 55.

The first longitudinally directed longitudinal wall 84 extends upward along the tunnel left side wall 31 from an inner end of the first laterally directed longitudinal wall 83. The second longitudinally directed longitudinal wall 87 extends upward along the tunnel left side wall 31 from an inner end of the second laterally directed longitudinal wall 86. The upper side wall 75 is formed between the first longitudinally directed longitudinal wall 84 and the second longitudinally directed longitudinal wall 87.

The upper side wall 75 extends to be an upslope toward the inner side in the vehicle width direction to an upper end part (that is, the tunnel top part 33) of the tunnel left side wall 31 along the first longitudinally directed longitudinal wall 84 and the second longitudinally directed longitudinal wall 87 from an inner end 73a of the upper slope wall 73 and an inner end 74a of the upper top part 74.

The upper folded part 76 is folded inward in the vehicle width direction along the tunnel top part 33 from an upper end of the upper side wall 75.

The first upper flange 77 protrudes toward the vehicle body frontward direction along the tunnel left side wall 31 from an inner side of the first longitudinally directed longitudinal wall 84. The second upper flange 78 protrudes toward the vehicle body rearward direction along the tunnel left side wall 31 from an inner side of the second longitudinally directed longitudinal wall 87.

The third upper flange 79 protrudes toward the vehicle body frontward direction along the tunnel top part 33 from a front side of the upper folded part 76. The third upper flange 79 is connected to the first upper flange 77. The first upper flange 77 and the third upper flange 79 are formed in an L shape in cross-section.

The fourth upper flange 81 protrudes toward the vehicle body rearward direction along the tunnel top part 33 from a rear side of the upper folded part 76. The fourth upper flange 81 is connected to the second upper flange 78. The second upper flange 78 and the fourth upper flange 81 are formed in an L shape in cross-section.

A first cross member flange (cross member flange) 58 of the cross member 20 is formed of the third lower flange 67, the fourth lower flange 68, the first upper flange 77, and the third upper flange 79. The first cross member flange 58 extends in the vehicle body frontward direction from a first cross member longitudinal wall (cross member longitudinal wall) 21 of the cross member 20.

The first cross member longitudinal wall 21 is formed of the first upper longitudinal wall 71 and the first lower longitudinal wall 61.

A second cross member flange (cross member flange) 59 of the cross member 20 is formed of the fifth lower flange 69, the second upper flange 78, and the fourth upper flange 81. The second cross member flange 59 extends in the vehicle body rearward direction from a second cross member longitudinal wall (cross member longitudinal wall) 22 of the cross member 20.

The second cross member longitudinal wall 22 is formed of the second upper longitudinal wall 72 and the second lower longitudinal wall 63.

That is, the cross member 20 includes the first cross member longitudinal wall 21, the second cross member longitudinal wall 22, the first cross member flange 58, and the second cross member flange 59.

The first cross member longitudinal wall 21 extends in the vehicle width direction and the vertical direction. The second cross member longitudinal wall 22 extends in the vehicle width direction and the vertical direction.

The first cross member flange 58 extends in the vehicle body frontward direction along the tunnel left side wall 31 from an inner end of the first cross member longitudinal wall 21. The second cross member flange 59 extends in the vehicle body rearward direction along the tunnel left side wall 31 from an inner end of the second cross member longitudinal wall 22.

The first cross member longitudinal wall 21 and the first cross member flange 58 are formed substantially symmetrically to the second cross member longitudinal wall 22 and the second cross member flange 59 in the vehicle body front-to-rear direction. Therefore, hereinafter, the first cross member longitudinal wall 21 and the first cross member flange 58 are described in detail, and detailed description of the second cross member longitudinal wall 22 and the second cross member flange 59 is omitted.

Figure 8:
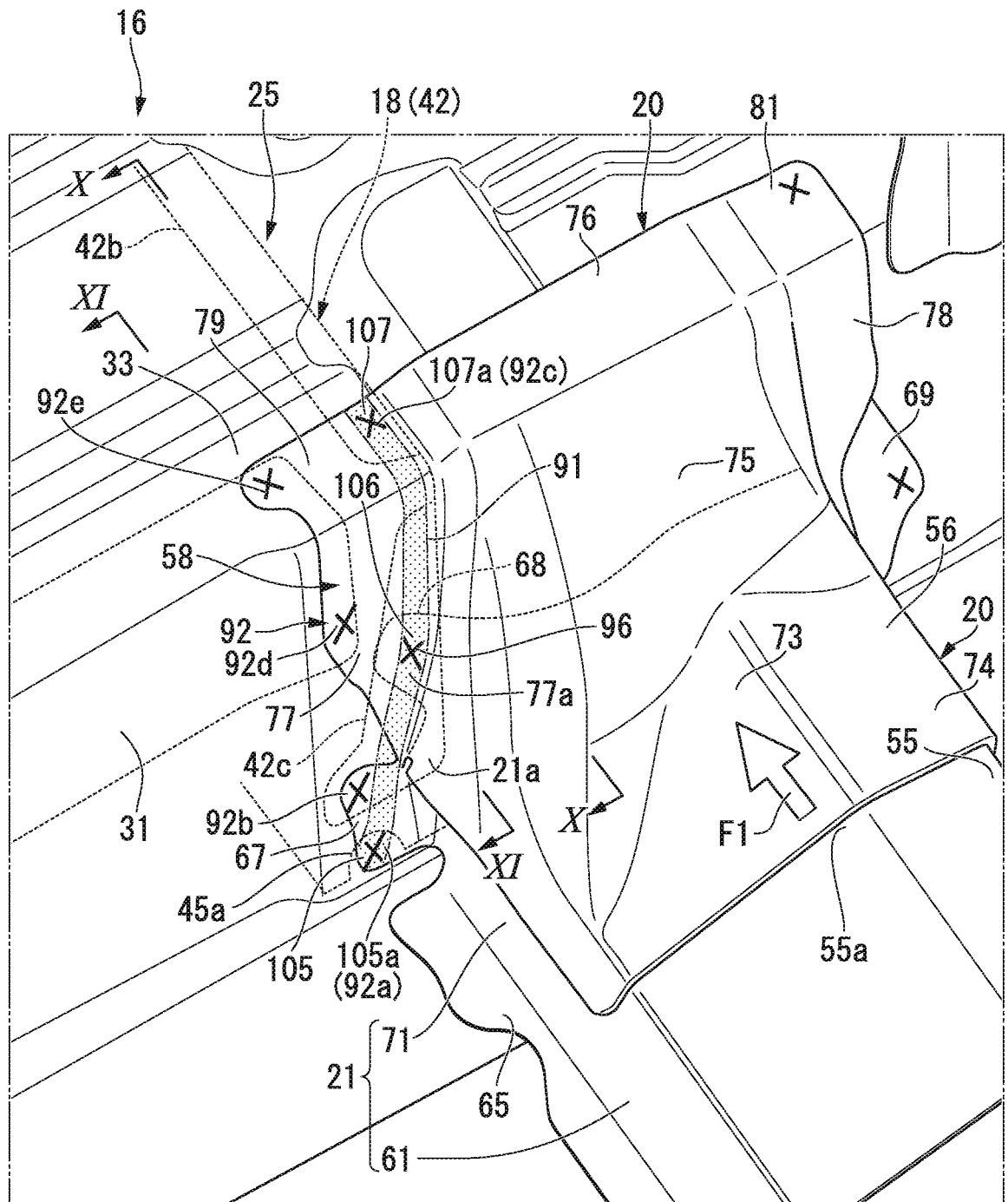
FIG. 8 is a perspective view showing an enlarged state of a VIII part of FIG. 5 in the embodiment of the present invention.

As shown in FIG. 3 and FIG. 8, the first cross member longitudinal wall 21 is arranged at the same position in the vehicle body front-to-rear direction as the first bulkhead longitudinal wall 42. The second cross member longitudinal wall 22 is arranged at the same position in the vehicle body front-to-rear direction as the second bulkhead longitudinal wall 43.

In this state, the first cross member flange 58 includes a bond part 91 and a welding part 92. The bond part 91 is bonded by a bond 94 (refer to FIG. 10) to the tunnel left side wall 31 of the floor tunnel 16 at a position close to an inner end part 21a of the first cross member longitudinal wall 21.

In this way, the bond part 91 and the welding part 92 are provided on the first cross member flange 58. The bond part 91 is a region that is bonded to the floor tunnel 16 by the bond 94. It is possible to apply the bond 94 to the vicinity of the first cross member longitudinal wall 21. Therefore, the bond part 91 is provided in the vicinity of the inner end part 21a of the first cross member longitudinal wall 21.

The welding part 92 includes a first welding section 92a, a second welding section 92b, a third welding section 92c, a fourth welding section 92d, and a fifth welding section 92e.

The first welding section 92a, the second welding section 92b, the third welding section 92c, the fourth welding section 92d, and the fifth welding section 92e are described in detail later.

Figure 9:
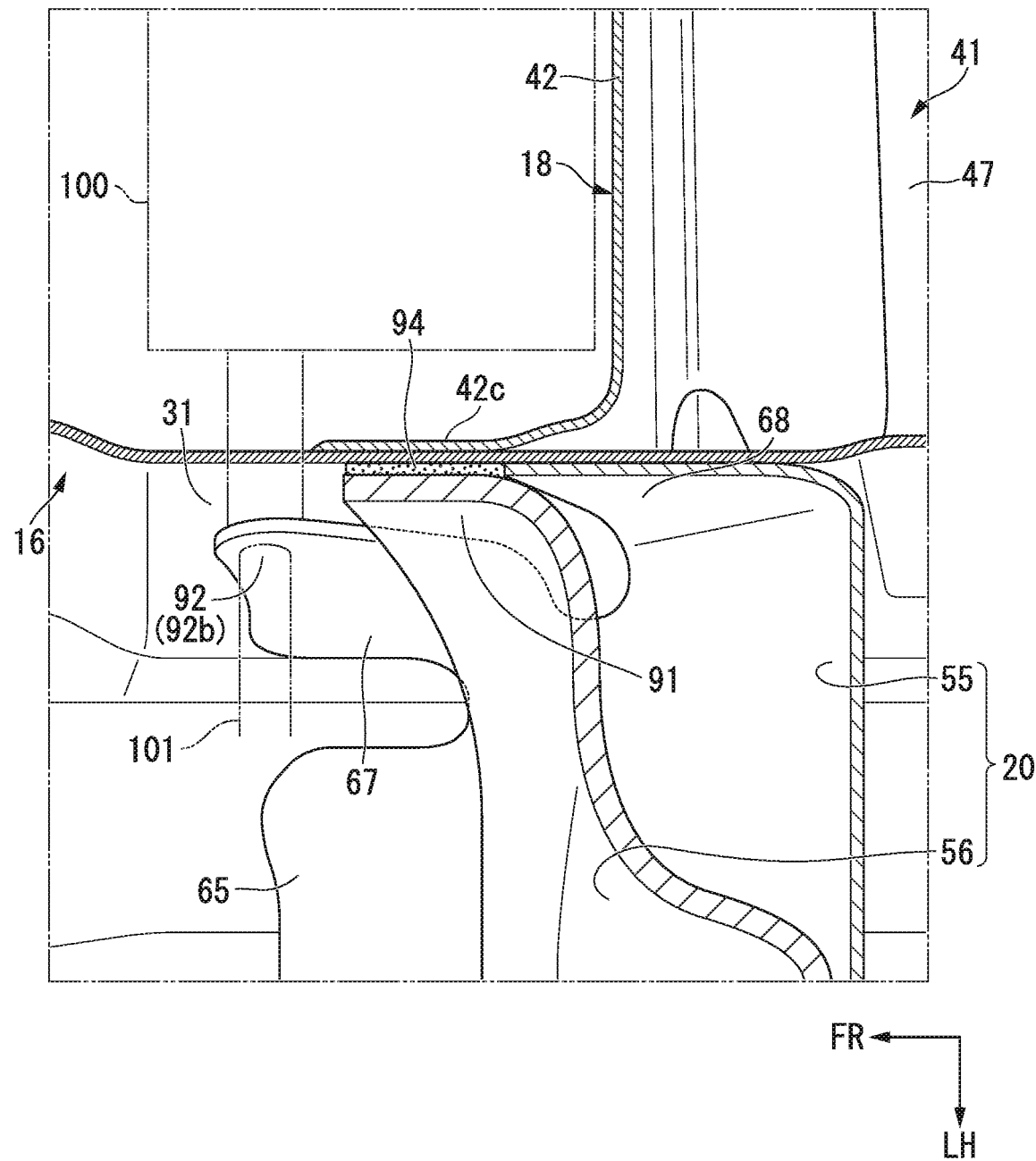
FIG. 9 is a cross-sectional view showing an enlarged state of a IX part of FIG. 3 in the embodiment of the present invention.

As shown in FIG. 9, the welding part 92 is a region that is welded to the tunnel left side wall 31 of the floor tunnel 16 by spot welding, for example, using welding equipment (welding gun) 100, 101. Therefore, it is necessary to prevent interference with the bulkhead 18 (specifically, the first bulkhead longitudinal wall 42) by the welding equipment 100, 101.

Accordingly, the welding part 92 is mainly provided at a position that is more separated in the vehicle body frontward direction than the first cross member longitudinal wall 21 with respect to the bond part 91.

With reference to FIG. 3 and FIG. 8, by providing the bond part 91 and the welding part 92 on the first cross member flange 58, it is possible to fix the bond part 91 of the first cross member flange 58 by bonding to the vicinity of the first cross member longitudinal wall 21. Accordingly, when an impact load F1 is input to the cross member 20, it is possible to prevent deformation of a region in the vicinity of the first cross member longitudinal wall 21 of the first cross member flange 58.

That is, it is possible to prevent position displacement of the first cross member longitudinal wall 21 relative to the first bulkhead longitudinal wall 42. Thereby, it is possible to favorably ensure a load transmissibility that allows an impact load F1 which is input to the cross member 20 from a vehicle body side direction to transmit from the first cross member longitudinal wall 21 to the first bulkhead longitudinal wall 42.

Further, the welding part 92 is provided at a region that is separated from the first bulkhead longitudinal wall 42 of the first cross member flange 58. Thereby, it is possible to ensure a joint strength of the cross member 20 (specifically, the first cross member flange 58) with respect to the floor tunnel 16.

The bond part 91 is bonded by the bond 94 (refer to FIG. 10) to the tunnel left side wall 31 continuously from the first lower flange 65 to the first upper flange 77.

Accordingly, it is possible to prevent position displacement between the first lower flange 65 and the first upper flange 77 by the bond 94. Thereby, it is possible to further favorably ensure a load transmissibility that allows an impact load F1 which is input to the cross member 20 from a vehicle body side direction to transmit from the first cross member longitudinal wall 21 to the first bulkhead longitudinal wall 42.

Figure 10:
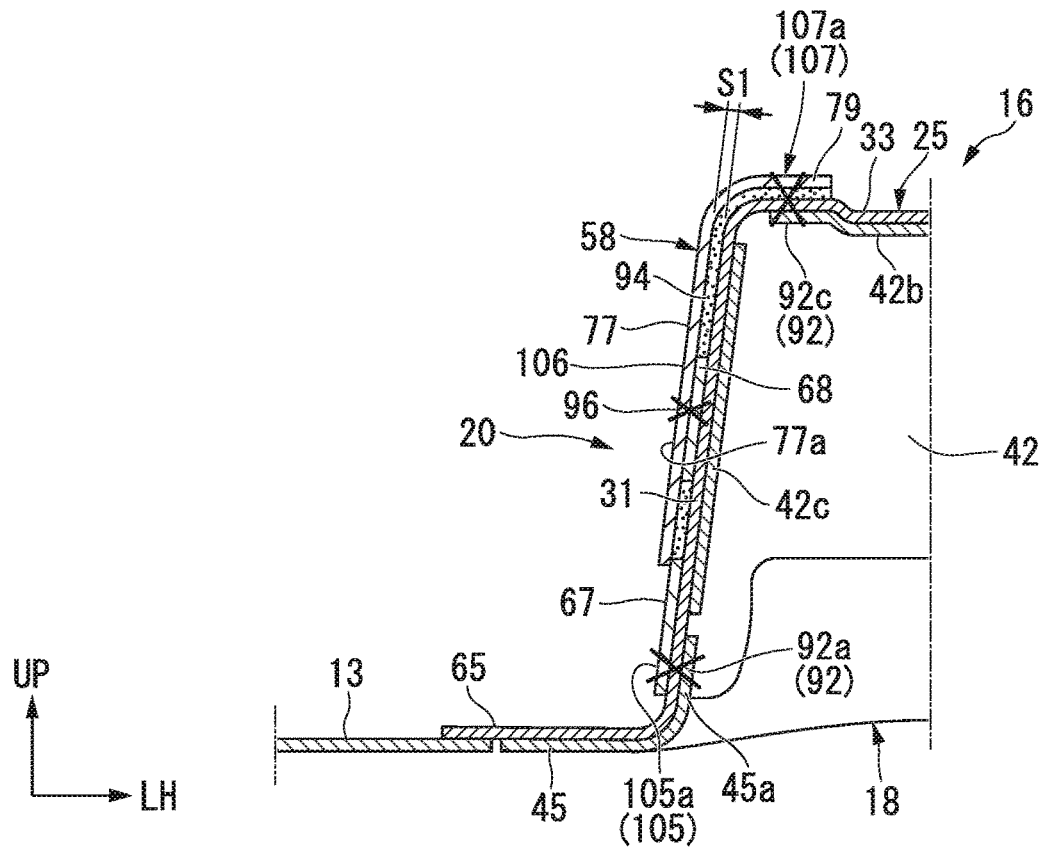
FIG. 10 is a cross-sectional view showing a state broken at a X-X line of FIG. 8 in the embodiment of the present invention.

As shown in FIG. 8 and FIG. 10, the first cross member flange 58 includes a flange welding part 96. In the flange welding part 96, the fourth lower flange 68 and a part 77a of the first upper flange 77 are in a state of being overlapped with each other and are welded to each other.

The flange welding part 96 is welded in advance in a state where the fourth lower flange 68 and the part 77a of the first upper flange 77 are overlapped with each other before the first cross member flange 58 is bonded to the tunnel left side wall 31 by the bond 94. The bond part 91 is provided so as to pass through the flange welding part 96.

In this way, the fourth lower flange 68 and the part 77a of the first upper flange 77 are welded in an overlapped state, and the flange welding part 96 is formed. Accordingly, it is possible to ensure the rigidity of the flange welding part 96. The bond part 91 is provided so as to pass through the flange welding part 96 having an ensured rigidity.

Thereby, it is possible to allow an impact load F1 to further favorably transmit from the first cross member longitudinal wall 21 to the first bulkhead longitudinal wall 42 by the flange welding part 96 having an ensured rigidity.

Further, the flange welding part 96 is welded in advance in a state where the fourth lower flange 68 and the part 77a of the first upper flange 77 are overlapped with each other before the first cross member flange 58 is bonded to the tunnel left side wall 31 by the bond 94. Accordingly, it is possible to enhance the assembly accuracy between the fourth lower flange 68 and the first upper flange 77. Thereby, it is possible to accurately position the flange welding part 96 to the bond part 91.

The cross member 20 includes the third lower flange 67, the fourth lower flange 68, the first upper flange 77, and the third upper flange 79 that are bonded to the floor tunnel 16 by the bond part 91. Further, the cross member 20 includes a first sole part 105, a three-component overlapping part 106, and a second sole part 107.

The first sole part 105 is a region at which the third lower flange 67 is solely overlapped to the tunnel left side wall 31 of the floor tunnel 16. The three-component overlapping part 106 is a region at which the fourth lower flange 68 and the first upper flange 77 are overlapped to the tunnel left side wall 31. The second sole part 107 is a region at which the third upper flange 79 is solely overlapped to the tunnel top part 33.

A start point 105a is provided on the first sole part 105. The start point 105a is welded to the tunnel left side wall 31, for example, by spot welding. An end point 107a is provided on the second sole part 107. The end point 107a is welded to the tunnel top part 33, for example, by spot welding. The bond part 91 is provided continuously from the start point 105a of the first sole part 105 via the three-component overlapping part 106 to the end point 107a of the second sole part 107.

Accordingly, the start point 105a and the end point 107a that are bonded to the floor tunnel 16 are solidly fixed by welding. Thereby, it is possible to prevent the start point 105a of the bond part 91 from peeling from the tunnel left side wall 31 of the floor tunnel 16. Further, it is possible to prevent the end point 107a of the bond part 91 from peeling from the tunnel top part 33 of the floor tunnel 16.

In the vicinity of the three-component overlapping part 106, it is conceivable that a gap S1 having a size of the third lower flange 67 opens between the tunnel left side wall 31 and the first upper flange 77. Further, it is conceivable that a gap S1 having a size of the fourth lower flange 68 opens between the tunnel left side wall 31 and the first upper flange 77.

Even in this case, the gap S1 having the size of the third lower flange 67 or the fourth lower flange 68 is filled by the bond 94. Accordingly, it is possible to bond the first upper flange 77 to the tunnel left side wall 31 by the bond 94. Thereby, it is possible to continuously bond three panels, namely the tunnel left side wall 31, the third lower flange 67, and the first upper flange 77. Similarly, it is possible to continuously bond three panels, namely the tunnel left side wall 31, the fourth lower flange 68, and the first upper flange 77.

Further, the start point 105a is provided on the first sole part 105, and the end point 107a is provided on the second sole part 107. The bond part 91 is provided continuously from the start point 105a via the three-component overlapping part 106 to the end point 107a. That is, the third lower flange 67, the fourth lower flange 68, the first upper flange 77, and the third upper flange 79 are bonded by the bond 94 to the tunnel main body 25 continuously from the start point 105a via the three-component overlapping part 106 to the end point 107a.

Accordingly, the third lower flange 67, the fourth lower flange 68, the first upper flange 77, and the third upper flange 79 are solidly bonded to the tunnel main body 25. Thereby, it is possible to allow an impact load F1 that is input to the third lower flange 67, the fourth lower flange 68, the first upper flange 77, and the third upper flange 79 to favorably transmit to the floor tunnel 16 side. That is, it is possible to favorably ensure a load transmissibility from the third lower flange 67, the fourth lower flange 68, the first upper flange 77, and the third upper flange 79 to the floor tunnel 16 side.

In the three-component overlapping part 106, the third lower flange 67 and the first upper flange 77 are overlapped in this order on the tunnel left side wall 31. In the three-component overlapping part 106, the fourth lower flange 68 and the first upper flange 77 are overlapped in this order on the tunnel left side wall 31.

The first upper flange 77 forms a first surface that extends along the tunnel left side wall 31. Further, the third upper flange 79 extends along the tunnel top part 33 and thereby forms a second surface that extends in a direction which crosses with respect to the first surface.

The three-component overlapping part 106 is provided on the first upper flange 77, which becomes the first surface. The end point 107a is provided on the third upper flange, 79 which becomes the second surface.

In this way, the third upper flange 79 extends in a direction that crosses with respect to the first upper flange 77. The three-component overlapping part 106 is provided on the first upper flange 77. The end point 107a is provided on the third upper flange 79.

Accordingly, in a state of a gap S1 having a size of the third lower flange 67 or the fourth lower flange 68 between the first upper flange 77 and the tunnel left side wall 31 being acceptable, it is possible to allow the third upper flange 79 and the tunnel top part 33 to be in contact with each other and to be welded to each other. Thereby, it is possible to enhance the assembly property of the floor tunnel 16, the third lower flange 67, the fourth lower flange 68, and the first upper flange 77.

As shown in FIG. 4 and FIG. 8, the welding part 92 is welded, for example, by spot welding to the tunnel left side wall 31 mainly at a position that is more separated in the vehicle body frontward direction than the first cross member longitudinal wall 21 with respect to the bond part 91.

The welding part 92 includes the first welding section 92a, the second welding section 92b, the third welding section 92c, the fourth welding section 92d, and the fifth welding section 92e.

The first welding section 92a is a region that becomes the start point 105a of the first sole part 105. In the first welding section 92a, the left flange section 45 (specifically, a protrusion piece 45a that protrudes from the left flange section 45) of the bulkhead 18, the tunnel left side wall 31, and the third lower flange 67 are welded to one another, for example, by spot welding (also refer to FIG. 10).

In the second welding section 92b, the first left longitudinal wall flange 42c (specifically, a lower end part of the first left longitudinal wall flange 42c) of the bulkhead 18, the tunnel left side wall 31, and the third lower flange 67 are welded to one another, for example, by spot welding.

The third welding section 92c is a region that becomes the end point 107a of the second sole part 107. In the third welding section 92c, the first upper longitudinal wall flange 42b (specifically, a left end part of the first upper longitudinal wall flange 42b) of the bulkhead 18, the tunnel top part 33, and the third upper flange 79 are welded to one another, for example, by spot welding (also refer to FIG. 10).

That is, the bulkhead 18 is welded to both the third lower flange 67 and the third upper flange 79. Accordingly, it is possible to reliably prevent position displacement of the first cross member longitudinal wall 21 relative to the first bulkhead longitudinal wall 42. Thereby, it is possible to allow an impact load F1 that is input to the cross member 20 from a vehicle body side direction to favorably transmit from the first cross member longitudinal wall 21 to the first bulkhead longitudinal wall 42 (also refer to FIG. 3).

Figure 11:
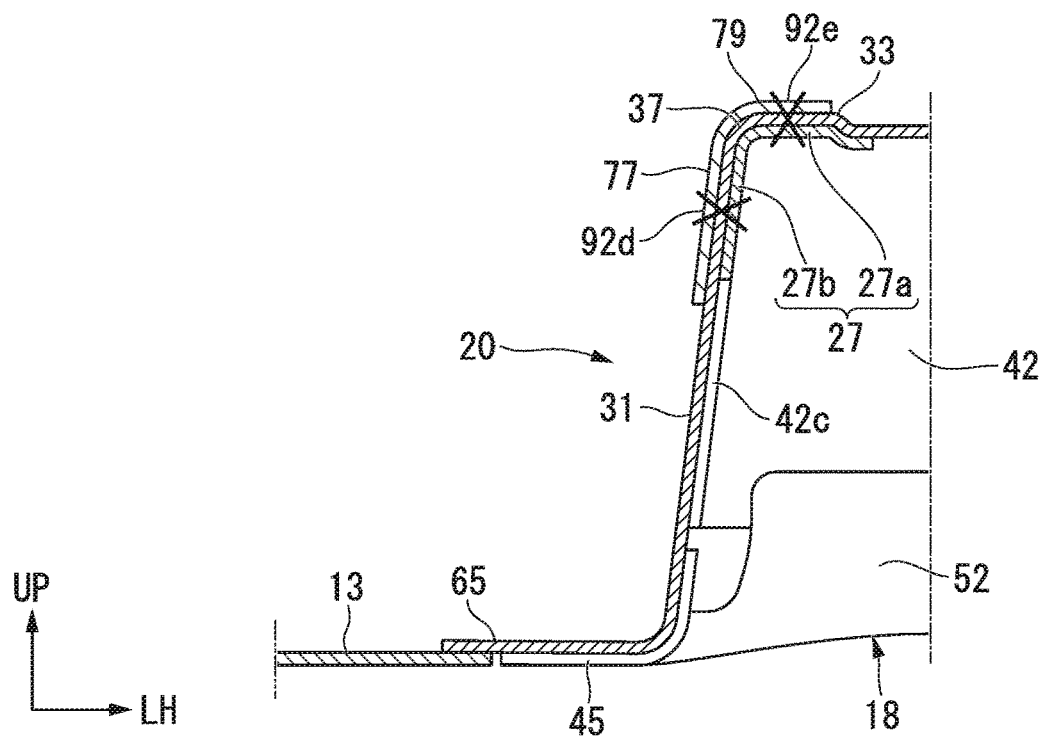
FIG. 11 is a cross-sectional view showing a state broken at a XI-XI line of FIG. 8 in the embodiment of the present invention.

As shown in FIG. 8 and FIG. 11, in the fourth welding section 92d, the patch vertical part 27b (specifically, a rear end portion of the patch vertical part 27b (also refer to FIG. 4)) of the left ridgeline patch 27, the tunnel left side wall 31, and the first upper flange 77 are welded to one another, for example, by spot welding.

In the fifth welding section 92e, the patch horizontal part 27a (specifically, a rear end portion of the patch horizontal part 27a (also refer to FIG. 4)) of the left ridgeline patch 27, the tunnel top part 33, and the third upper flange 79 are welded to one another, for example, by spot welding.

Accordingly, it is possible to allow an impact load F1 that is input to the cross member 20 from a vehicle body side direction to transmit to the vehicle body frontward direction of the floor tunnel 16 via the left ridgeline patch 27. Thereby, it is possible to support the impact load F1 that is input to the cross member 20 by the entire vehicle.

The technical scope of the present invention is not limited to the embodiment described above, and a variety of changes can be added without departing from the scope of the invention.

What is claimed is:

1. A vehicle body structure which is a structure of a vehicle body, comprising:
    a floor tunnel that is provided on a middle of a floor panel in a width direction of the vehicle body;
    a cross member that is joined to a side surface of the floor tunnel and that extends in the width direction of the vehicle body; and
    a bulkhead that is provided at an inner part of the floor tunnel,
    wherein the cross member comprises
    a cross member longitudinal wall that extends in the width direction of the vehicle body and a vertical direction of the vehicle body and
    a cross member flange that extends in a front-to-rear direction of the vehicle body from the cross member longitudinal wall,
    the bulkhead comprises
    a bulkhead longitudinal wall that extends in the width direction of the vehicle body and the vertical direction of the vehicle body,
    the cross member longitudinal wall and the bulkhead longitudinal wall are arranged at the same position in the front-to-rear direction of the vehicle body, and
    the cross member flange comprises
    a bond part that is bonded to the floor tunnel and
    a welding part that is welded to the floor tunnel at a position that is more separated from the cross member longitudinal wall than the bond part.

2. The vehicle body structure according to claim 1,
    wherein the cross member comprises
    a lower member that is provided on a side of the floor panel and
    an upper member that is provided on an upper side of the lower member,
    the cross member flange comprises
    a lower flange that is provided on the lower member and
    an upper flange that is provided on the upper member, and
    the bond part is bonded continuously from the lower flange to the upper flange.

3. The vehicle body structure according to claim 2,
    wherein the cross member flange comprises a flange welding part at which the lower flange and the upper flange are overlapped and are welded to each other, and
    the bond part is provided so as to pass through the flange welding part.

4. The vehicle body structure according to claim 2,
    wherein the bulkhead is welded to both the lower flange and the upper flange.

5. The vehicle body structure according to claim 3,
    wherein the bulkhead is welded to both the lower flange and the upper flange.

6. The vehicle body structure according to claim 1,
    wherein the floor tunnel comprises a ridgeline patch that extends in the front-to-rear direction of the vehicle body along a ridgeline, and
    the cross member flange is welded to the ridgeline patch.

7. The vehicle body structure according to claim 2,
    wherein the floor tunnel comprises a ridgeline patch that extends in the front-to-rear direction of the vehicle body along a ridgeline, and
    the cross member flange is welded to the ridgeline patch.

8. The vehicle body structure according to claim 3,
    wherein the floor tunnel comprises a ridgeline patch that extends in the front-to-rear direction of the vehicle body along a ridgeline, and
    the cross member flange is welded to the ridgeline patch.

9. The vehicle body structure according to claim 4,
    wherein the floor tunnel comprises a ridgeline patch that extends in the front-to-rear direction of the vehicle body along a ridgeline, and
    the cross member flange is welded to the ridgeline patch.

10. The vehicle body structure according to claim 5,
wherein the floor tunnel comprises a ridgeline patch that extends in the front-to-rear direction of the vehicle body along a ridgeline, and
the cross member flange is welded to the ridgeline patch.

* * * * *